(12) United States Patent
Sung et al.

(10) Patent No.: US 12,494,726 B2
(45) Date of Patent: Dec. 9, 2025

(54) METHOD AND DEVICE FOR DETERMINING CURRENT OF ELECTRIC MOTOR OR GENERATOR

(71) Applicant: KOREA INSTITUTE OF OCEAN SCIENCE & TECHNOLOGY, Busan (KR)

(72) Inventors: So Young Sung, Seoul (KR); Hee Jin Kang, Gyeryong-si (KR); Hyung Won Shim, Sejong-si (KR); Youngshik Kim, Daejeon (KR); Yunho Kim, Daejeon (KR); Jang Pyo Hong, Daejeon (KR)

(73) Assignee: KOREA INSTITUTE OF OCEAN SCIENCE & TECHNOLOGY, Busan (KR)

( * ) Notice: Subject to any disclaimer, the term of this patent is extended or adjusted under 35 U.S.C. 154(b) by 244 days.

(21) Appl. No.: 18/032,712

(22) PCT Filed: Nov. 11, 2020

(86) PCT No.: PCT/KR2020/095141
§ 371 (c)(1),
(2) Date: Apr. 19, 2023

(87) PCT Pub. No.: WO2022/085866
PCT Pub. Date: Apr. 28, 2022

(65) Prior Publication Data
US 2023/0396196 A1 Dec. 7, 2023

(30) Foreign Application Priority Data
Oct. 20, 2020 (KR) .................. 10-2020-0136251

(51) Int. Cl.
*H02P 21/13* (2006.01)
*G01R 19/00* (2006.01)
(Continued)

(52) U.S. Cl.
CPC .......... *H02P 21/13* (2013.01); *G01R 19/0092* (2013.01); *G01R 31/34* (2013.01); *H02P 21/22* (2016.02)

(58) Field of Classification Search
CPC .......... H02P 21/13; H02P 21/22; H02P 21/14; H02P 23/14; H02P 27/00; G01R 19/0092;
(Continued)

(56) References Cited

U.S. PATENT DOCUMENTS 6,181,092 B1 * 1/2001 Turner ................ H02P 25/0925
318/400.2
6,721,375 B1 4/2004 Hammel
(Continued)

FOREIGN PATENT DOCUMENTS

JP 2000-206167 A 7/2000
JP 2002-530987 A 9/2002
(Continued)

OTHER PUBLICATIONS

Soyoung Sung, et al., "Compensation Technique for Delay Times of Various Feedback Filters in a Three-Phase Control System for Synchronous Machines", Journal of Electrical Engineering & Technology, 2021, pp. 3069-3080, vol. 16.
(Continued)

*Primary Examiner* — David Luo
(74) *Attorney, Agent, or Firm* — Sughrue Mion, PLLC

(57) ABSTRACT

Provided, according to one embodiment, is a method for determining a current of an electric motor or a generator, the method comprising the steps of: acquiring characteristics of a filter for eliminating noise occurring in a process for determining a current of an electric motor or a generator; determining a time delay caused by the filter, on the basis of a change in a phase indicating the characteristics of the filter, the change resulting from a change in an operating fre-
(Continued)

quency of the electric motor or the generator; and determining the current of the electric motor or the generator by compensating the time delay.

13 Claims, 14 Drawing Sheets

(51) Int. Cl.
*G01R 31/34* (2020.01)
*H02P 21/22* (2016.01)
(58) Field of Classification Search
CPC .............. G01R 31/34; G01R 19/16533; G01R 31/343; H03H 11/1286; H03H 17/0416; H03H 17/06; Y10S 388/902
USPC ......................................... 318/144, 141, 140
See application file for complete search history.

(56) References Cited

U.S. PATENT DOCUMENTS

| | | | |
|---|---|---|---|
| 8,050,825 B2 | 11/2011 | Ikeda et al. | |
| 8,203,302 B2* | 6/2012 | Ramu | H02P 25/092 318/254.1 |
| 9,515,589 B2 | 12/2016 | Kozaki | |
| 9,698,717 B2 | 7/2017 | Yamaguchi et al. | |
| 2010/0004824 A1 | 1/2010 | Ikeda et al. | |
| 2012/0217915 A1 | 8/2012 | Wu et al. | |
| 2014/0112801 A1 | 4/2014 | Kozaki | |
| 2016/0197568 A1* | 7/2016 | Sung | H02P 6/15 318/400.13 |
| 2016/0226415 A1 | 8/2016 | Yamaguchi et al. | |
| 2020/0319616 A1 | 10/2020 | Oho et al. | |

FOREIGN PATENT DOCUMENTS

| | | |
|---|---|---|
| JP | 2010-012933 A | 1/2010 |
| JP | 2014-507108 A | 3/2014 |
| JP | 2014-103841 A | 6/2014 |
| JP | 2016-144226 A | 8/2016 |
| JP | 2016-220407 A | 12/2016 |
| JP | 2017-135513 A | 8/2017 |
| JP | 2020-170354 A | 10/2020 |
| KR | 10-2013-0080701 A | 7/2013 |
| KR | 10-2015-0011779 A | 2/2015 |
| KR | 10-2018-0007213 A | 1/2018 |
| WO | 2019/049328 A1 | 3/2019 |

OTHER PUBLICATIONS

International Search Report for PCT/KR2020/095141 dated Jul. 16, 2021 (PCT/ISA/210).
Communication issued Oct. 17, 2024 in Chinese Patent Application No. 202080106472.9.
Communication issued Feb. 13, 2024 in Japanese Application No. 2023-524537.
Extended European Search Report dated Apr. 2, 2024 in Application No. 20958816.9.

* cited by examiner

METHOD AND DEVICE FOR DETERMINING CURRENT OF ELECTRIC MOTOR OR GENERATOR

CROSS REFERENCE TO RELATED APPLICATIONS

This application is a National Stage of International Application No. PCT/KR2020/095141 filed Nov. 11, 2020, claiming priority based on Korean Patent Application No. 10-2020-0136251 filed Oct. 20, 2020, the entire disclosures of which are incorporated herein by reference.

TECHNICAL FIELD

The present disclosure relates to a method and device for determining a current of an electric motor or generator, and more particularly, to a method and device for controlling a current of an electric motor or generator by effectively compensating for a time delay caused by a filter.

BACKGROUND ART

In general, a control system of a three-phase synchronous electric motor/generator includes a power conversion part using pulse width modulation (PWM) and a real-time control part for controlling a torque/current/speed/position. Most basically, for torque control, a current signal of an electric motor/generator is measured, a three-phase rotation coordinate system is converted into a two-phase stationary coordinate system, and current control is performed on the position information of a rotor to generate a desired torque. In this case, it is essential to use a non-contact sensor such as a hall sensor to measure a current of a three-phase synchronous motor/generator, and to use a low-pass filter to remove electrical noise included in a current signal and a harmonic noise signal such as a PWM signal. The low-pass filter used for measuring a current signal may be configured in various forms such as an analog filter and a digital filter. However, a time delay occurs in an output signal of a filter due to the influence of the filter compared to an input signal. The time delay is also referred to as a group delay, and when a measured current signal is asynchronous with the position information of the rotor by the group delay, a phase of a two-phase stationary coordinate system of a synchronous electric motor/generator control system on a d-q axis is shifted, thus preventing optimal performance from being obtained.

To solve this problem, techniques for minimizing a group delay to be controlled by setting a bandwidth of a filter to be higher than a basic driving frequency of the electric motor/generator during the measurement of a current or compensating for the group delay using a lookup table when the group delay is easily calculated, for example, in the case of a simple primary resistor-capacitor (RC) filter have been suggested.

However, these methods are difficult to use in high-speed devices with an electric motor of very small synchronous resistance and inductance in motor/generator, and can not effectively eliminate high-frequency noise generated due to PWM and switching noise of a power conversion element. In order to solve this problem, a filter of second or more higher order is installed in a current measurement sensor part and an anti-aliasing filter (AAF) is installed in front-end of an analog-digital converter (ADC) to be used for operations of a digital electric motor control algorithm to remove electrical noise from a signal, which passes through the ADC, using a digital filter such as a finite impulse response (FIR) filter, but as described above, as the performance of the filter increases, a delay time increases due to the filters, resulting in the degradation of control performance of the electric motor/generator.

Therefore, there is a growing need for technology for fixing the above-described problems.

DISCLOSURE

Technical Problem

To address the above-described problems of the related art, embodiments of the present disclosure are directed to providing a method and device for controlling a current of an electric motor or a generator by effectively compensating for a time delay caused by a filter.

Aspects of the present disclosure are not limited thereto and other aspects that are not mentioned here will be clearly understood from the following description.

Technical Solution

According to a first aspect of the present disclosure, a method of determining a current of an electric motor or generator includes obtaining characteristics of a filter for eliminating noise generated during determination of a current of the electric motor or generator, determining a time delay caused by the filter on the basis of a change in a phase indicating the characteristics of the filter versus a change in an operating frequency of the electric motor or generator, and determining a current of the electric motor or generator by compensating for the time delay.

A magnitude and a phase each indicating the characteristics of the filter may be determined by the operating frequency.

The filter may include at least one of a low-pass filter, an anti-aliasing filter, or a finite impulse response (FIR) filter.

The filter may include a low-pass filter, an anti-aliasing filter, and a finite impulse response (FIR) filter, and the time delay may be determined by adding a first time delay caused by the low-pass filter, a second time delay caused by the anti-aliasing filter, and a third time delay caused by the FIR filter.

The determining of the current of the electric motor or generator may include updating a phase of the current of the electric motor or generator on the basis of a value obtained by multiplying the time delay[sec] by the operating frequency.

The determining of the time delay may include determining the time delay by differentiating a phase of a transfer function indicating the characteristics of the filter with respect to the operating frequency, and the operating frequency may be used as an input variable for the phase of the transfer function.

When the transfer function $G_2(s)$ satisfies the following Equation (1), the time delay $\rho_2$ may satisfy the following Equation (2):

$$G_2(s) = \frac{\omega_n^2}{s^2 + 2\zeta\omega_n s + \omega_n^2} \quad (1)$$

$$\rho_2 = -\frac{2\zeta\omega_n(\omega^2 + \omega_n^2)}{\omega^4 + 2\omega_n^2(2\zeta - 1)\omega^2 + \omega_n^4} \quad (2)$$

According to a second aspect of the present disclosure, a device for determining a current of an electric motor or generator includes a filter configured to filter noise generated during determination of a current of the electric motor or generator, and a processor configured to obtain characteristics of the filter, determine a time delay caused by the filter on the basis of a change in a phase indicating the characteristics of the filter versus a change in an operating frequency of the electric motor or generator, and determine a current of the electric motor or generator by compensating for the time delay.

A magnitude and a phase each indicating the characteristics of the filter may be determined by the operating frequency.

The filter may include at least one of a low-pass filter, an anti-aliasing filter, or a finite impulse response (FIR) filter.

The filter may include a low-pass filter, an anti-aliasing filter, and a finite impulse response (FIR) filter, and the time delay may be determined by adding a first time delay caused by the low-pass filter, a second time delay caused by the anti-aliasing filter, and a third time delay caused by the FIR filter.

The processor may update a phase of the current of the electric motor or generator on the basis of a value obtained by multiplying the time delay by the operating frequency.

The processor may determine the time delay by differentiating a phase of a transfer function indicating the characteristics of the filter with respect to the operating frequency, and the operating frequency may be used as an input variable for the phase of the transfer function.

When the transfer function $G_2(s)$ satisfies the following Equation (1), the time delay $\rho_2$ may satisfy the following Equation (2).

$$G_2(s) = \frac{\omega_n^2}{s^2 + 2\zeta\omega_n s + \omega_n^2} \quad (1)$$

$$\rho_2 = -\frac{2\zeta\omega_n(\omega^2 + \omega_n^2)}{\omega^4 + 2\omega_n^2(2\zeta - 1)\omega^2 + \omega_n^4} \quad (2)$$

According to a third aspect of the present disclosure, there is provided a computer-readable recording medium having recorded thereon a program for performing the method of the first aspect in a computer. According to a fourth aspect of the present disclosure, there is provided a computer program stored in a recording medium to perform the method of the first aspect.

Advantageous Effects

According to an embodiment of the present disclosure, a current of an electric motor or a generator can be controlled by effectively compensating for a time delay caused by a filter. In addition, the time delay due to the filter can be optimally compensated for on the basis of a result of analyzing characteristics of various types of filters available in an electric motor/generator control system.

In addition, a mechanical output, a speed of rotation, torque at the same current, and the like can be remarkably improved by effectively compensating for a time delay.

It should be understood that effects of the present disclosure are not limited thereto and include all effects inferable from the configuration of the present disclosure described in the detailed description or claims of the present disclosure.

MODES OF THE INVENTION

In example embodiments, general terms that have been widely used nowadays are selected, when possible, in consideration of functions of the present disclosure, but non-general terms may be selected according to the intentions of technicians in this art, precedents, or new technologies, etc. Some terms may be arbitrarily chosen by the present applicant. In this case, the meanings of these terms will be explained in corresponding parts of the present disclosure in detail. Accordingly, the terms used herein should be defined not based on the names thereof but based on the meanings thereof and the whole context of the present disclosure.

It will be understood that when an element is referred to as "including" another element, the element may further include other elements unless mentioned otherwise. Terms such as "unit", "module," and the like, when used herein, represent units for processing at least one function or operation, which may be implemented by hardware, software, or a combination of hardware and software.

Example embodiments of the present disclosure will be described in detail with reference to the accompanying drawings below so that they may be easily implemented by those of ordinary skill in the art. However, the present disclosure may be embodied in many different forms and is not limited to the example embodiments of the present disclosure set forth herein.

Hereinafter, embodiments of the present disclosure will be described in detail with reference to the accompanying drawings.

Figure 1:
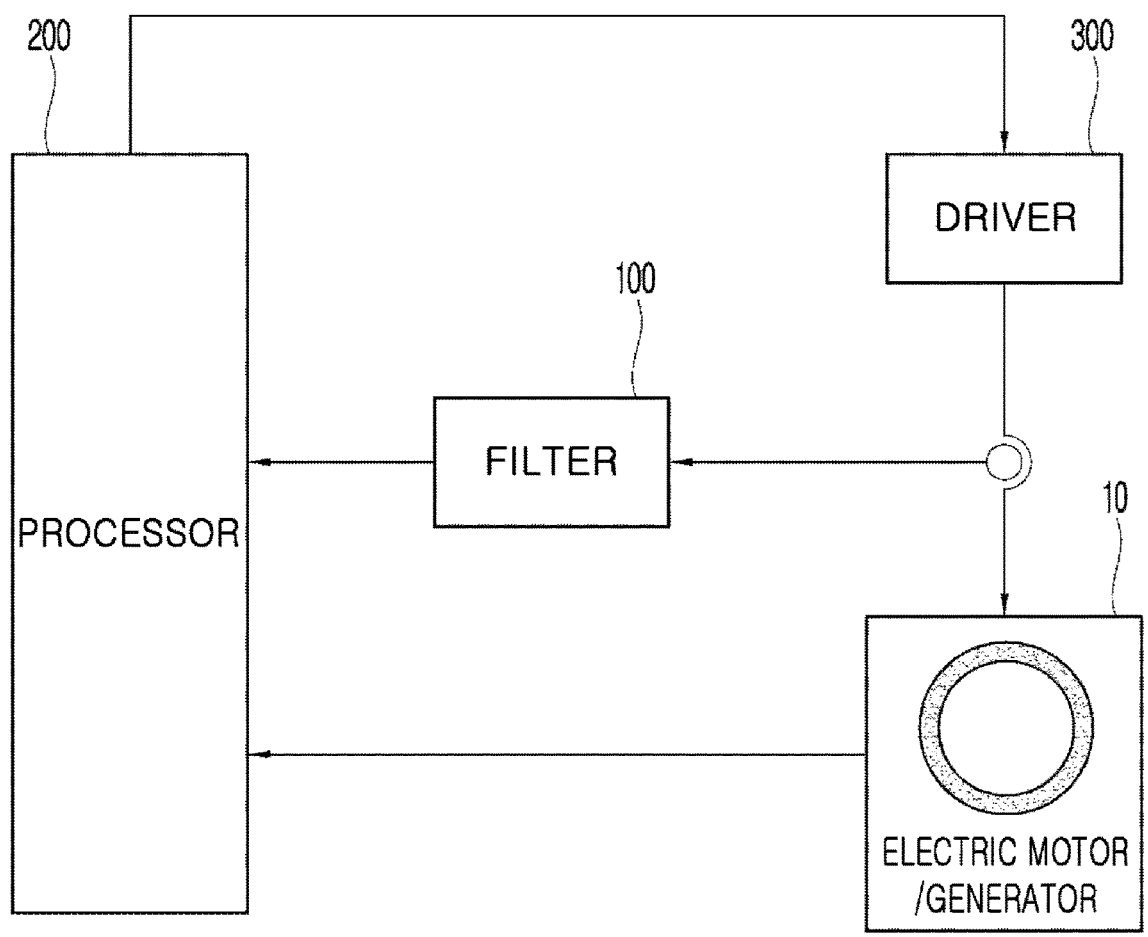
FIG. 1 is a block diagram schematically illustrating a configuration of a current determination device according to an embodiment.

FIG. 1 is a block diagram schematically illustrating a configuration of a current determination device 1000 according to an embodiment.

Referring to FIG. 1, the current determination device 1000 may include a filter 100 and a processor 200.

The filter 100 may filter noise generated during the determination of a current of an electric motor/generator 10, and may receive a current signal, for example, from a current sensor part (not shown) disposed in front of the filter 100 to measure a current signal of the electric motor/generator 10, remove noise from the current signal, and output a resultant signal.

In an embodiment, the filter 100 may include at least one of a low-pass filter 110, an anti-aliasing filter 120, or a finite impact response (FIR) filter 130 but is not limited thereto, and may include various types of filters required to control a current of the electric motor/generator 10 and be embodied as any of various types of filters such as an analog filter and a digital filter.

In an embodiment, the filter 100 may be implemented to include one or more filters of first order or more, and for example, the low-pass filter 110 may include a primary filter or a secondary filter or may be designed as a specific order filter that is a combination of one or more primary filters and a secondary filter.

The processor 200 may obtain characteristics of the filter 100. In an embodiment, a magnitude and a phase of the filter 100 that indicate characteristics of the filter 100 may be determined according to an operating frequency. For example, the processor 200 may determine a magnitude function and a phase function in a frequency domain from a previously stored transfer function indicating the characteristics of the filter 100. In an embodiment, information indicating the characteristics of the filter 100 (e.g., the transfer function, order information, a circuit implementation method, circuit design parameters, etc.) may be stored in a memory or received from a user interface or an external device according to user settings.

The processor 200 may determine a time delay caused by the filter 100 on the basis of a change in a phase indicating the characteristics of the filter 100 versus a change in an operating frequency of the electric motor/generator 10. In an embodiment, a time delay may be determined by differentiating a phase of the transfer function indicating the characteristics of the filter 100 with respect to the operating frequency, and the operating frequency may be used as an input variable for the phase of the transfer function.

The processor 200 may determine a current of the electric motor/generator 10 by compensating for the time delay. In an embodiment, the processor 200 may update a phase of the current of the electric motor/generator 10 on the basis of a value obtained by multiplying the time delay by the operating frequency. For example, the processor 200 may obtain a time delay by adding a first time delay, a second time delay, and a third time delay caused by the low-pass filter 110, the anti-aliasing filter 120, and the FIR filter 130, respectively, and compensate for a damping ratio of a gain function by multiplying the time delay by a value w calculated on the basis of position information of a rotor.

Determining and compensating for a time delay caused by the filter 100 according to various embodiments will be described with reference to FIGS. 2 to 9 below.

Figure 2:
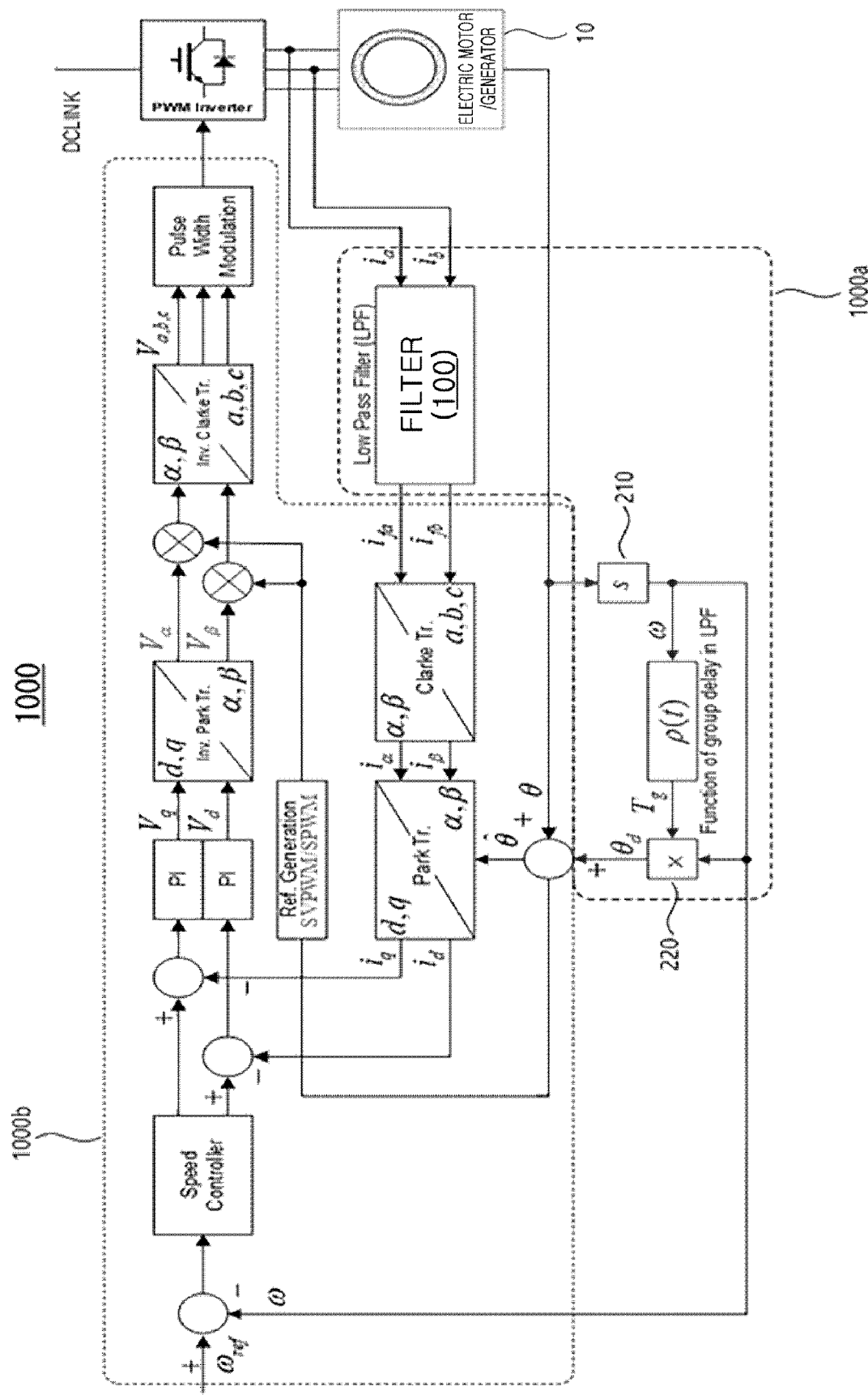
FIG. 2 is a detailed block diagram of an example of a configuration of a current determination device according to an embodiment.

FIG. 2 is a detailed block diagram of an example of a configuration of a current determination device 1000 according to an embodiment.

Referring to FIG. 2, the current determination device 1000 may be divided into a first part 1000a for determining a time delay caused by a filter 100 on the basis of characteristics of the filter 100 and a second part 1000b for determining and controlling a current of an electric motor/generator 10 on the basis of the determined time delay.

In an embodiment, in the first part 1000a, a processor 200 may include a differentiator 210 and a time delay calculator 220.

In an embodiment, the differentiator 210 may differentiate a phase of a transfer function indicating characteristics of the filter 100 with respect to an operating frequency. For example, the differentiator 210 may receive information about a phase angle θ from a rotor position detector (not shown) disposed in front of the differentiator 210 to detect a position of a rotor of an electric motor/generator 10, and differentiate a phase function determined by a transfer function of a low-pass filter 110 with respect to an operating frequency w to determine a time delay function ρ(t) indicating characteristics of a time delay ρ.

In an embodiment, the time delay calculator 220 may determine a time delay (e.g., $T_g$) on the basis of the time delay function ρ(t) determined by the differentiator 210, and determine a phase compensation value $θ_d$ for compensating for the time delay by multiplying the determined time delay by an operating frequency of the electric motor/generator 10.

In an embodiment, the processor 200 may determine a current of the electric motor/generator 10 on the basis of a phase θ of the current of the electric motor/generator 10 and the phase compensation value $θ_d$, and control the driving of the electric motor/generator 10 according to the determined current.

The above-described operations may be performed in a different way depending on the characteristics of the filter 100, and a method of determining a time delay more accurately and compensating for the time delay according to degrees of various types of filters and a filter implementation method.

In a first embodiment, the low-pass filter 110 included in the filter 100 may be a primary filter, and when a first transfer function $G_1(s)$ of the low-pass filter 110 satisfies Equation 1, a first time delay $ρ_1$ may satisfy Equation 4. More specifically, the first transfer function $G_1(s)$ of the low-pass filter 110 may include information about a gain and phase of an input/output signal and thus be expressed by Equation 1. The processor 200 may respectively determine a first magnitude function $M_1$ and a first phase function $ψ_1$ of the low-pass filter 110 by Equations 2 and 3 by substituting a frequency domain operator (s=jw) for the first transfer function $G_1(s)$ of Equation 1, and determine the first time delay $ρ_1$ indicating an instantaneous delay time with respect to a frequency by differentiating the first phase function $ψ_1$ of Equation 3 with respect to a frequency w.

$$G_1(s) = \frac{\omega_n}{s + \omega_n} = |G_1(s)| \angle G_1(s) \quad \text{[Equation 1]}$$

$$M_1 = |G_1(j\omega)| = \left|\frac{\omega_n}{j\omega + \omega_n}\right| = \frac{\omega_n}{\sqrt{\omega^2 + \omega_n^2}} \quad \text{[Equation 2]}$$

$$\psi_1 = \angle G_1(j\omega) = -\tan^{-1}\left(\frac{\omega}{\omega_n}\right) \quad \text{[Equation 3]}$$

$$\rho_1 = \frac{d\psi_1}{d\omega} = -\frac{\omega_n}{\omega^2 + \omega_n^2} = -\frac{1}{\omega_n}\left[1 + \left(\frac{\omega}{\omega_n}\right)\right]^{-1} \quad \text{[Equation 4]}$$

Figure 5:
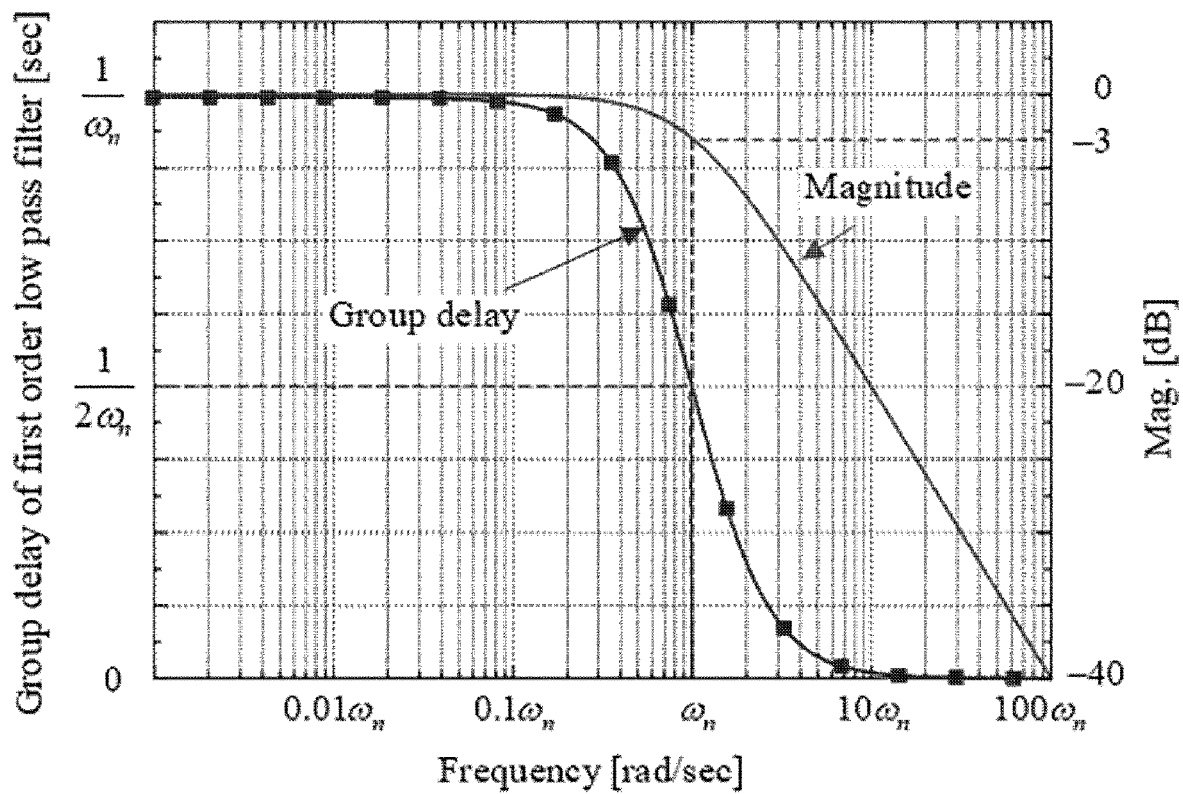
FIG. 5 is a graph related to a frequency according to the first embodiment.

A graph showing a gain and a time delay versus a frequency according to the first embodiment is as that shown in FIG. 5, in which a time delay varied according to a frequency, a maximum time delay was $w_n^{-1}$, a rate of change in time delay per unit frequency was largest in a range of $0.1*w_n$ to $w_n$, and the maximum time delay halved at a point where a gain is −3 dB.

In a second embodiment, the low-pass filter 110 included in the filter 100 may be a secondary filter, and when a second transfer function $G_2(s)$ of the low-pass filter 110 satisfies Equation 5, a second time delay $\rho_2$ may satisfy Equation 8. More specifically, the second transfer function $G_2(s)$ of the low-pass filter 110 may be expressed by Equation 5, and the processor 200 may respectively determine a second magnitude function $M_2$ and a second phase function $\psi_2$ of the low-pass filter 110 by Equations 6 and 7 by substituting a frequency domain operator (s=jw) for the second transfer function $G_2(s)$ of Equation 5, and determine the second time delay $\rho_2$ indicating an instantaneous time delay with respect to a frequency by Equation 8 by differentiating the second phase function $\psi_2$ of Equation 7 with respect to a frequency w.

$$G_2(s) = \frac{\omega_n^2}{s^2 + 2\zeta\omega_n s + \omega_n^2} = |G_2(s)| \angle G_2(s) \quad \text{[Equation 5]}$$

$$M_2 = \quad \text{[Equation 6]}$$
$$|G_2(j\omega)| = \left|\frac{\omega_n^2}{\omega_n^2 - \omega^2 + j2\zeta\omega_n\omega}\right| = \frac{\omega_n^2}{\sqrt{(\omega_n^2 - \omega^2)^2 + (2\zeta\omega_n\omega)^2}}$$

$$\psi_2 = -\tan^{-1}\left(\frac{2\zeta\omega_n\omega}{\omega_n^2 - \omega^2}\right) \quad \text{[Equation 7]}$$

$$\rho_2 = -\frac{2\zeta\omega_n(\omega^2 + \omega_n^2)}{\omega^4 + 2\omega_n^2(2\zeta - 1)\omega^2 + \omega_n^4} \quad \text{[Equation 8]}$$

In the second embodiment, the processor 200 may determine the relationship between the frequency w and the second time delay $\rho_2$ by Equation 9, based on Equation 8. In an embodiment, a damping factor $\zeta$ may be set to an integer of 0 to 1, and when $\zeta=1$, a frequency doubled in a range of 0 to $w_n$ as in the case of the primary filter of the first embodiment and a group delay doubled compared to that in the case of the primary filter.

$$\rho_2(\omega) = \begin{cases} -\frac{2\zeta}{\omega_n}, & \omega = 0 \\ -\frac{1}{\zeta\omega_n}, & \omega = \omega_n \\ 0, & \omega = \infty \end{cases} \quad \text{[Equation 9]}$$

Figure 6:
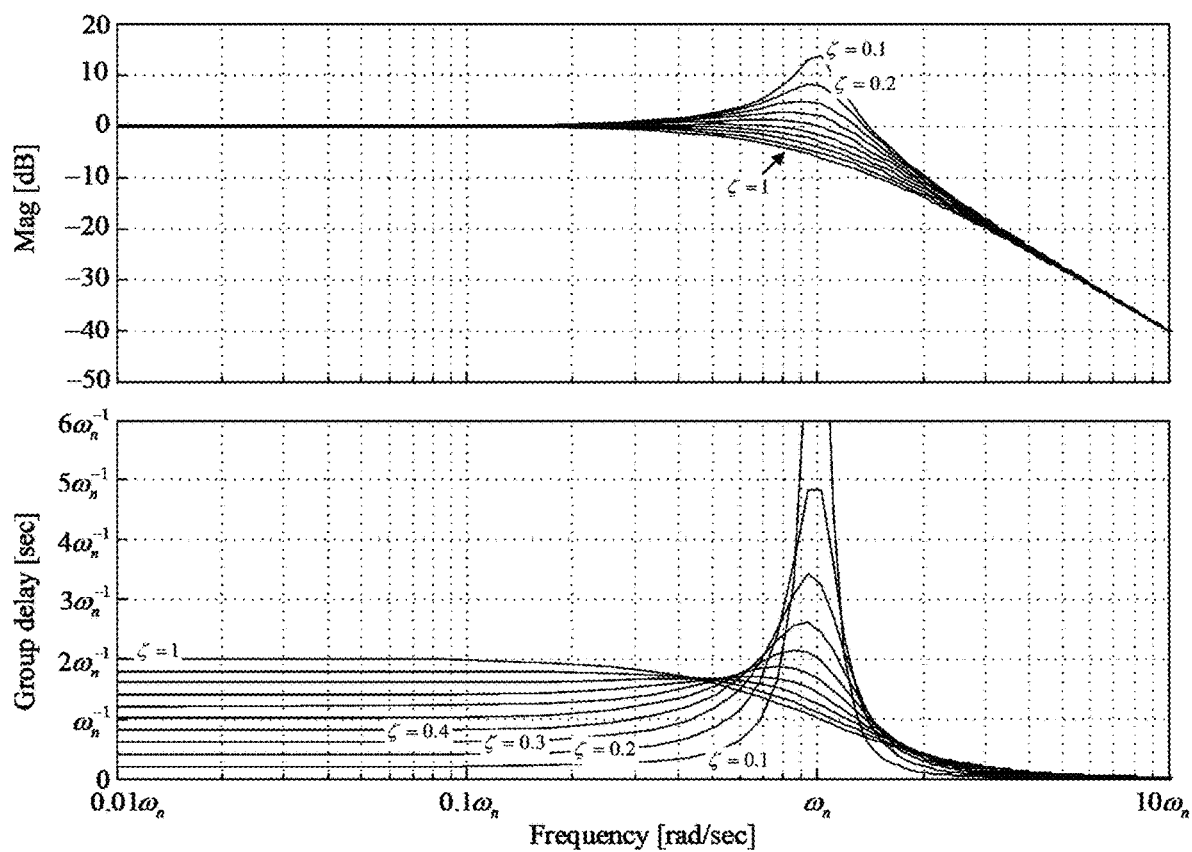
FIG. 6 is a graph related to a frequency according to the second embodiment.

A graph showing a magnitude and a group delay versus a frequency with respect to each of a plurality of damping factors $\zeta$ according to the second embodiment is shown in FIG. 6, in which the damping factors $\zeta$ may be in a range of $0<\zeta<1$, a group delay when $\zeta<0.7$ was less than when $\zeta=1$ and was largest near a cutoff frequency, and a gain and a time delay sharply increased at a cutoff frequency $w_n$ as the damping factor $\zeta$ decreased.

In the second embodiment, the processor 100 may calculate a peak value of a gain function by Equation 10, based on Equation 6. The processor 200 may calculate a peak value of a group delay, and because a denominator is a fourth-order polynomial and a numerator is a second-order polynomial, a denominator term of an eighth-order polynomial and a numerator term of a fifth-order polynomial are obtained when a frequency is differentiated and thus there are several solutions. However, a group delay should be greater than 0 and thus Equation 11 may be used, $$\frac{dM_2(\omega)}{d\omega} = 0 \Rightarrow \omega_{Mp} = \omega_n\sqrt{1 - 2\zeta^2} \quad \text{[Equation 10]}$$

$$\frac{d}{d\omega}\rho_2(\omega) = 0 \Rightarrow \omega_{Gp} = \sqrt{2\omega_n^2\sqrt{1 - \zeta^2} - \omega_n^2} \quad \text{[Equation 11]}$$

In the second embodiment, the processor 200 may define a relationship of $0 \leq \zeta \leq 1/\sqrt{2}$ for the damping factor $\zeta$ of the secondary low-pass filter on the basis of a condition of $(1-2\zeta^2)>0$ that should be satisfied to calculate a real-number value according to Equation 10, and determine a gain function at $w_n$ by Equation 12 on the basis of Equation 6.

$$M_2(\omega)|_{\omega=\omega_n} = \frac{1}{2\zeta} \Rightarrow -20\log 2\zeta [dB] \quad \text{[Equation 12]}$$

In the second embodiment, the processor 200 may determine the damping factor $\zeta$ to achieve a gain value of −3 [dB] at a cutoff frequency $w_n$, and for example, the damping factor $\zeta$ may be designed to be 0.707 so that an output value according to Equation 12 may be −3 [dB].

In a third embodiment, the low-pass filter 110 included in the filter 100 may include a combination of one or more primary filters and a secondary filter, and may be designed as, for example, a high-order filter using one or more of Equations 1 to 8.

In a fourth embodiment, an analog filter included in the filter 100 may include the anti-aliasing filter 120. In an embodiment, the analog filter may be determined based on a circuit implementation method and circuit parameters, and may be designed according to, for example, the Sallen-Key method or a multiple feedback method. Here, the Sallen-Key method may be used to amplify a single gain or a signal of 20 [DB] or less, and the multiple feedback method may be used to amplify a signal greater than 20 [dB].

Figure 7:
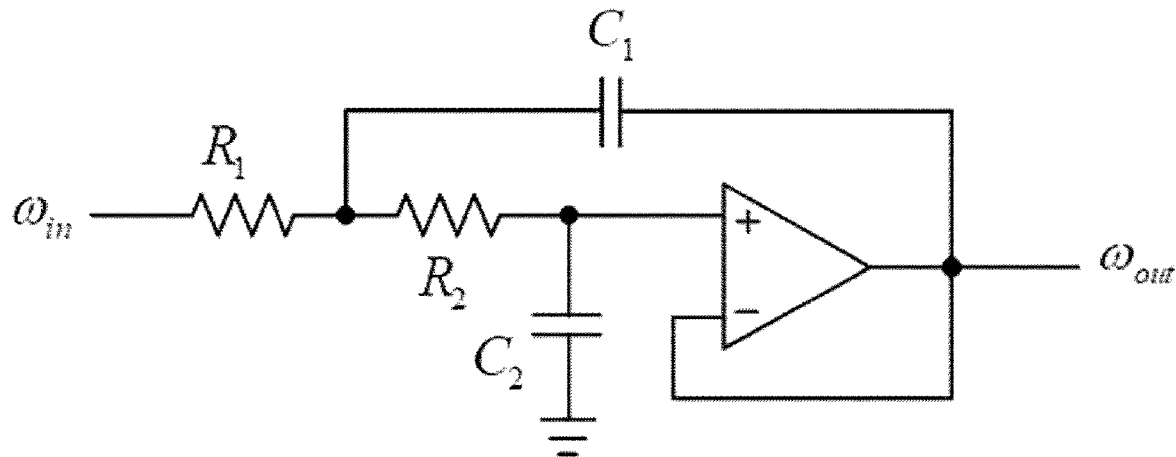
FIG. 7 is a circuit diagram of a Sallen-Key type low-pass filter according to a fourth embodiment.

A circuit diagram of the low-pass filter 110 of Sallen-Key type according to the fourth embodiment is shown in FIG. 7, and a third transfer function A(s) of the low-pass filter 110 of Sallen-Key type may be determined by Equation 13. In this case, the processor 200 may calculate a third time delay $\rho_s$ by Equation 13 in the same manner as in the above-described embodiments, and specifically, when the third transfer function A(s) of the low-pass filter 110 satisfies Equation 13, a third magnitude function Ms and a third phase function $\psi_S$ of the low-pass filter 110 may respectively satisfy Equations 14 and 15 and the third time delay $\rho_s$ may satisfy Equation 16.

$$A(s) = \quad \text{[Equation 13]}$$
$$\frac{1}{\omega_n^2 R_1 R_2 C_1 C_2 s^2 + \omega_n[C_1(R_1 + R_2)s + 1]} = \frac{1}{k_1 s^2 + k_2 s + 1}$$

$$M_s(\omega) = \frac{1}{\sqrt{(k_1\omega - 1)^2 - k_2^2\omega^2}} \quad \text{[Equation 14]}$$

$$\psi_s = -\tan^{-1}\left(\frac{k_2\omega}{1 - k_1\omega^2}\right) \quad \text{[Equation 15]}$$

$$\rho_s(\omega) = -\frac{k_2(k_1\omega^2 + 1)}{k_1^2\omega^4 - 2k_1\omega^2 + k_2^2\omega^2 + 1} \quad \text{[Equation 16]}$$

In the fourth embodiment, the processor 200 may obtain a filter coefficient and a gain characteristic value as shown in Table 1, and in an embodiment, capacitances $C_1$ and $C_2$ may be determined as shown in Equation 17 by setting resistance values of a circuit to satisfy $R_1=R_2=R$, but embodiments are not limited thereto and resistance values may be set to specific values selected and input by a user.

TABLE 1

| Type | $k_1$ | $k_2$ | $\zeta$ |
| --- | --- | --- | --- |
| Butt. | 1.0 | 1.4142 | 0.7071 |
| C 0.01[dB] | 1.0469 | 1.4118 | 0.6899 |
| C 0.1[dB] | 1.2182 | 1.3695 | 0.6203 |
| C 0.25[dB] | 1.2081 | 1.3581 | 0.6178 |
| C 0.5[dB] | 1.2738 | 1.3066 | 0.5788 |
| C 1[dB] | 1.3448 | 1.2125 | 0.5227 |
| Bessel | 0.6164 | 1.3599 | 0.8660 |
| LP 0.05[deg] | 0.6832 | 1.3783 | 0.8337 |
| LP 0.5[deg] | 0.8161 | 1.4022 | 0.7760 |
| Elliptic | 0.1076 | 0.4639 | 0.7071 |
| Gaussian | 0.0100 | 0.1847 | 0.9238 |

(Here, Butt. stands for Butterworth, C stands for Chebyshev, and LP stands for linear phase)

$$C_1 = \frac{k_2}{2\omega_n R} \qquad \text{[Equation 17]}$$

$$C_2 = \frac{k_1}{\omega_n^2 R^2 C_1} = \frac{2k_1}{\omega_n k_2 R}$$

In the fourth embodiment, the processor 200 may obtain a magnitude of $M_2(0.5w_n)$ at a half cutoff frequency ($=0.5w_n$), a highest frequency $w_{Mp}$ and a largest magnitude $M_2(w_{Mp})$ as shown in Table 2 on the basis of Table 1, and gain characteristics of a Butterworth filter, a Chebyshev filter, and an Elliptic filter did not change to a large extent at the half cutoff frequency but gain characteristics of a Bessel filter, a linear phase filter, and a Gaussian filter decreased gradually as a frequency increased.

TABLE 2

| Type | $M_2(0.5\,w_n)$ | $M_2(w_{Mp})$ | $w_{Mp}$ |
| --- | --- | --- | --- |
| Butt. | 0.97014 | 1.00000 | 0 |
| C 0.01[dB] | 0.98129 | 1.00116 | 0.21915 |
| C 0.1[dB] | 1.02739 | 1.02760 | 0.47982 |
| C 0.25[dB] | 1.02912 | 1.02922 | 0.48641 |
| C 0.5[dB] | 1.05551 | 1.05928 | 0.57431 |
| C 1[dB] | 1.09383 | 1.12195 | 0.67336 |
| Bessel | 0.87287 | 1.15472 | 0 |
| LP 0.05[deg] | 0.89171 | 1.08613 | 0 |
| LP 0.5[deg] | 0.92658 | 1.02159 | 0 |
| Elliptic | 0.97014 | 1.00000 | 0 |
| Gaussian | 0.84035 | 1.41421 | 0 |

Figure 8:
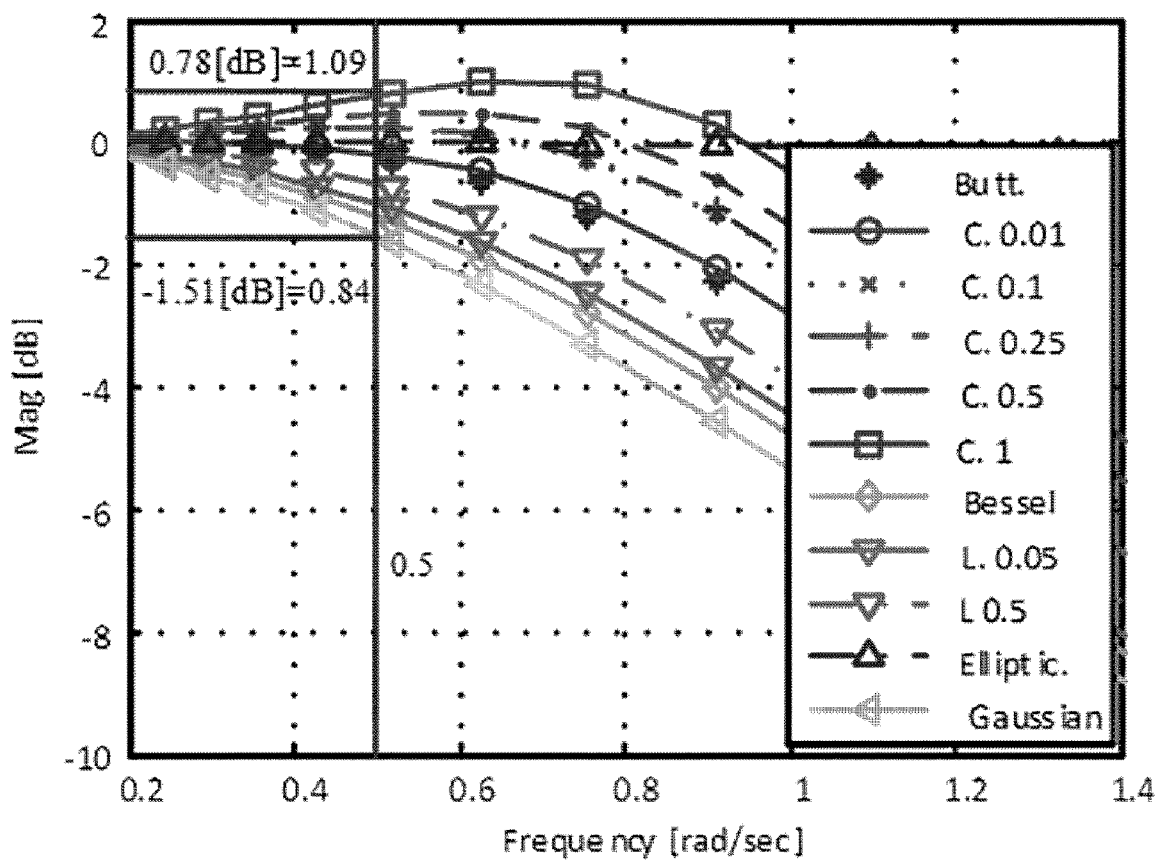
FIGS. 8 and 9 are graphs showing results of simulating magnitude characteristics and time delay characteristics determined for each of various types of filters by a device according to the fourth embodiment.
Figure 9:
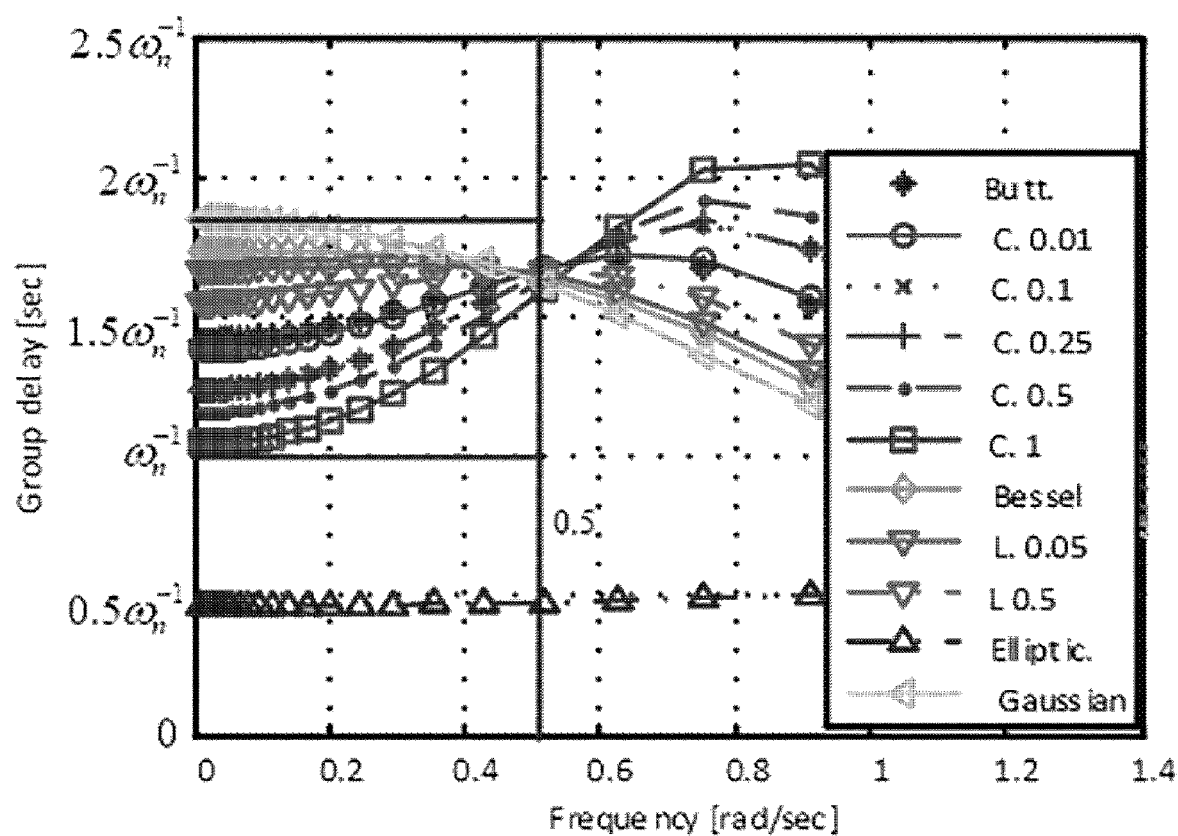

In the fourth embodiment, the processor 200 may determine a group delay using Table 2, and obtain time delay characteristics appearing in a frequency domain as shown in Table 3 and FIG. 8. As described above, time delay characteristics greatly depend on the type of a filter, and the Butterworth filter, the Chebyshev filter, and the Gaussian filter showed a relatively large rate of change in time delay, and the Bessel filter, the linear phase filter, and the elliptic filter exhibited the smallest rate of change in time delay at the half cutoff frequency. In particular, the elliptic filter exhibited the smallest time delay at frequencies of $0.5\,w_n$ or less.

TABLE 3

| Type | $\rho_2(0)$ | $\rho_2(0.5\,w_n)$ | $\rho_2(w_n)$ |
| --- | --- | --- | --- |
| Butt. | 1.414 | 1.664 | 1.414 |
| C 0.01[dB] | 1.38 | 1.661 | 1.449 |
| C 0.1[dB] | 1.241 | 1.637 | 1.612 |
| C 0.25[dB] | 1.236 | 1.636 | 1.619 |
| C 0.5[dB] | 1.158 | 1.612 | 1.728 |
| C 1[dB] | 1.046 | 1.564 | 1.913 |
| Bessel | 1.732 | 1.65 | 1.155 |
| LP 0.05[deg] | 1.668 | 1.658 | 1.2 |
| LP 0.5[deg] | 1.552 | 1.666 | 1.289 |
| Elliptic | 0.464 | 0.546 | 0.464 |
| Gaussian | 1.848 | 1.631 | 1.082 |

In the fourth embodiment, the filter 100 may include the anti-aliasing filter 120, and the anti-aliasing filter 120 may include the elliptic filter. For example, the anti-aliasing filter 120 may include the elliptic filter in front of an analog-digital converter (ADC) to be used for an operation of a control algorithm of the electric motor/generator 10, and in this case, as shown in Table 3 and FIG. 9, the elliptic filter may be implemented to decrease a time delay on the basis of facts that a rate of change in time delay characteristics is relatively small in a pass band and a time delay is smallest at a frequency of $0.5\,w_n$ or less, thereby improving performance. In a fifth embodiment, a digital filter included in the filter 100 may include the FIR filter 130 and an infinite impulse response (IIR) filter (not shown). In the fifth embodiment, the IIR filter may be implemented using a transfer function of an analog filter and a group delay of the IIR filter is similar to that of the analog filter. In an embodiment, the IIR filter may convert Equation 5 into a continuous state equation and convert the continuous state equation into a discrete state equation, and for example, Equation 18 may be used as the discrete state equation of the IIR filter. Here, $f_s$ denotes a sampling frequency, $u(k)$ denotes an input signal of a filter, $y(k)$ denotes an output signal of the filter, $x_1$ and $x_2$ denote state variables, K may be expressed by Equation 19, constants $\zeta$, $w_n$ and $f_s$ may be set by a user during the designing of the filter, all values in a matrix may be constants, and an output value of the IIR filter may be calculated by a state equation. Similarly, a time delay may be calculated by Equation 8.

$$\begin{bmatrix} x_1(k+1) \\ x_2(k+1) \end{bmatrix} = \frac{2}{K}\begin{bmatrix} 4f_s^2 & -2f_s\omega_n^2 \\ 2f_s & \omega_n^2 \end{bmatrix}\begin{bmatrix} x_1(k) \\ x_2(k) \end{bmatrix} + \frac{2\sqrt{f_s}}{K}\begin{bmatrix} 2f_s \\ 1 \end{bmatrix}u(k) \quad \text{[Equation 18]}$$

$$y(k) = \frac{2\omega_n^2}{K}\sqrt{f_s}\,[\,1\ \ 2(f_s + \zeta\omega_n)\,]\begin{bmatrix} x_1(k) \\ x_2(k) \end{bmatrix} + \frac{\omega_n^2}{K}u(k)$$

$$K = \omega_n^2 + 4f_s(\zeta\omega_n + f_s) \qquad \text{[Equation 19]}$$

In a fifth embodiment, an FIR filter may exhibit a constant group delay in all frequency domains and may be implemented by a direct realization method or an optimized realization method. In an embodiment, the direct realization method may be executed by dividing the number of times N that the FIR filter is tapped by a sampling frequency and the optimized realization method may be executed on the basis of Equation 20.

$$T_{FIR} = \begin{cases} \dfrac{N-1}{2} \times \dfrac{1}{f_2} & :\ \text{Odd} \\ \dfrac{N}{2} \times \dfrac{1}{f_s} & :\ \text{Even} \end{cases} \qquad \text{[Equation 20]}$$

Figure 3:
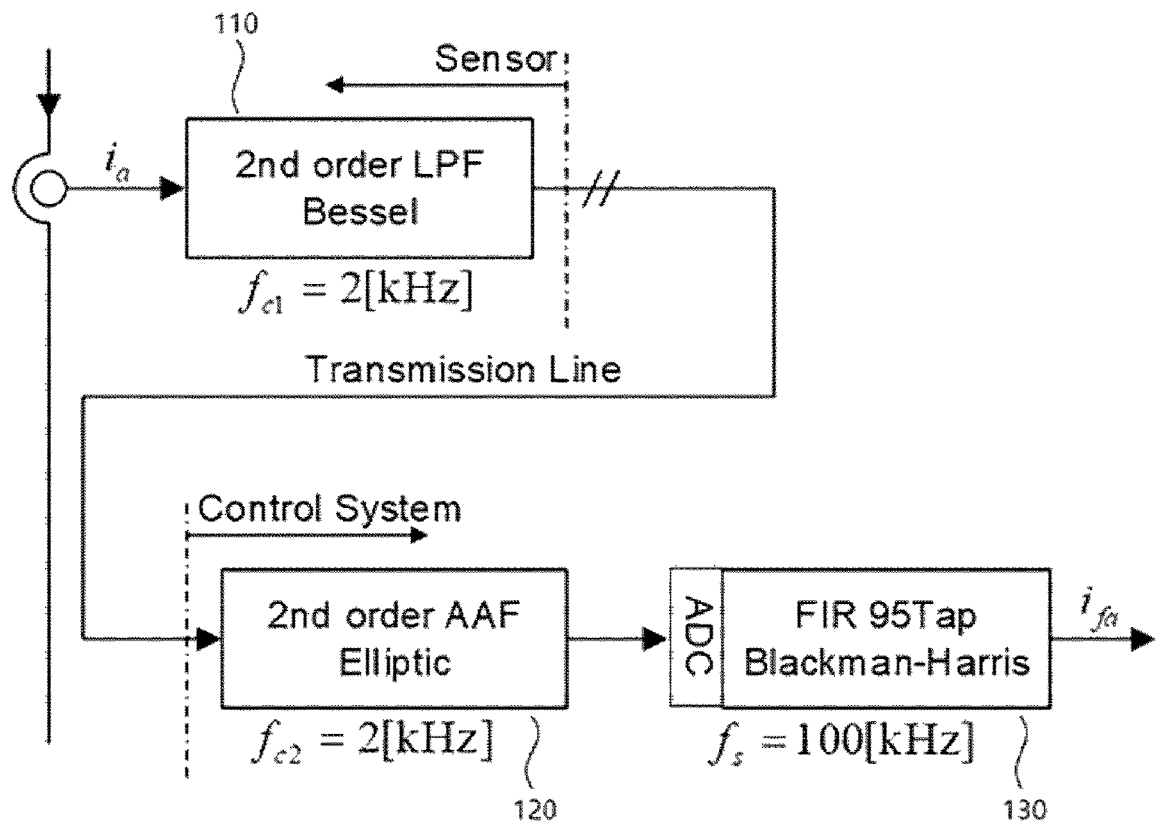
FIG. 3 is a block diagram of a filter according to a sixth embodiment.
Figure 4:
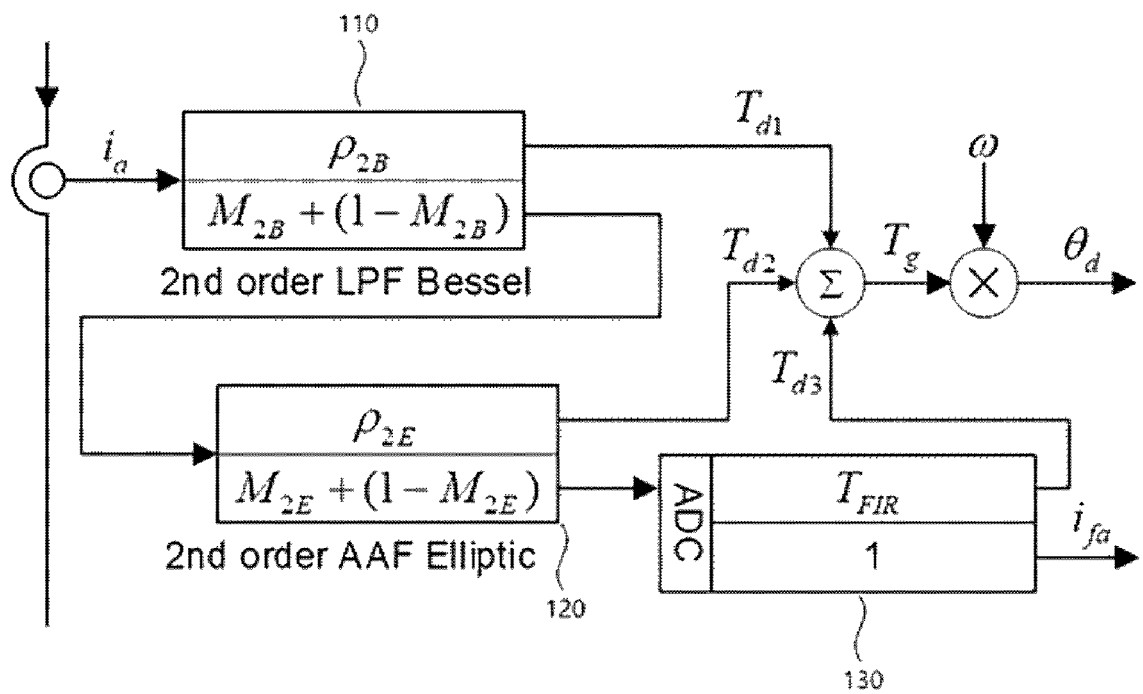
FIG. 4 is a conceptual diagram for describing an operation of a device according to the sixth embodiment.

FIG. 3 is a block diagram of a filter 100 according to a sixth embodiment. FIG. 4 is a conceptual diagram for describing an operation of the device 1000 according to the sixth embodiment.

Referring to FIG. 3, the filter 100 may include a low-pass filter 110, an anti-aliasing filter 120, and an FIR filter 130. In an embodiment, in the device 1000, a combination of various types of filters may be used to effectively control the electric motor/generator 10. For example, the filter 100 may include the low-pass filter 110 included in a current sensor part (not shown) to measure a current of the electric motor/generator 10, the anti-aliasing filter 120 provided in front of an ADC, and the FIR filter 130 included in a logic module (e.g., a field-programmable gate array (FPGA)) when the logic module is used to control the ADC, and may further include an IIR filter connected to either the processor 200 that controls the electric motor/generator 10 in real time or a driver 300 to finally remove electric noise from a current signal and a PMW frequency.

Referring to FIG. 4, the filter 100 may include a low-pass filter 110 which is a Bessel type secondary filter provided at a rear end of a current sensor unit, an anti-aliasing filter 120 which is an elliptic type secondary filter provided in front of an ADC, and an FIR filter 130 which a Blackman-Harris type filter included in a field-programmable gate array (FPGA), and the processor 200 may determine a time delay $T_g$ by combining a first time delay $T_{d1}$ caused by the low-pass filter 110, a second time delay $T_{d2}$ caused by the low-pass filter 110 and the anti-aliasing filter 120, and a third time delay $T_{d3}$ caused by the low-pass filter 110, the anti-aliasing filter 120, and the FIR filter 130, calculate a frequency w using position information of a rotor and the above-described equations, and determine a phase compensation value $\theta_d$ by multiplying the time delay $T_g$ by the calculated frequency w.

In the sixth embodiment, the first time delay Tai to the third time delay $T_{d3}$ may be determined on the basis of the above-described method, and for example, the processor 200 may determine a gain function $M_{2B}$ and a time delay function $\rho_{2B}$ of the low-pass filter 110 of Bessel type as shown in Equations 21 and 22 on the basis of the damping factor $\zeta$ shown in Table 1 and the cutoff frequency $w_{n-}$ (=2πf) determined by Equations 6 and 8, and determine a gain function $M_{2E}$ and a time delay function $\rho_{2E}$ of the anti-aliasing filter 120 of elliptic type as shown in Equations 24 and 25 on the basis of a cutoff frequency $w_{nE}$ according to Equation 23, $$M_{2B} = \frac{1.57914 \times 10^8}{\sqrt{(\omega^2 - 1.57914 \times 10^8)^2 + 4.73713 \times 10^8 \omega^2}}$$ [Equation 21]

$$\rho_{2B} = \frac{21765.0 \times (\omega^2 + 1.57914 \times 10^8)}{\omega^4 + 2.31186 \times 10^8 + 2.49367 \times 10^{16}}$$ [Equation 22]

$$\omega_{nE} = k_E \times 2\pi f_c = 7.5 \times 2\pi f_c$$ [Equation 23]

$$M_{2E} = \frac{8.88264 \times 10^9}{\sqrt{(\omega^2 - 8.88264 \times 10^9)^2 + 1.77649 \times 10^{10} \omega^2}}$$ [Equation 24]

$$\rho_{2E} = \frac{133285.0 \times (\omega^2 + 8.88264 \times 10^9)}{\omega^4 + 7.35838 \times 10^9 + 7.89014 \times 10^{19}}$$ [Equation 25]

Figure 10:
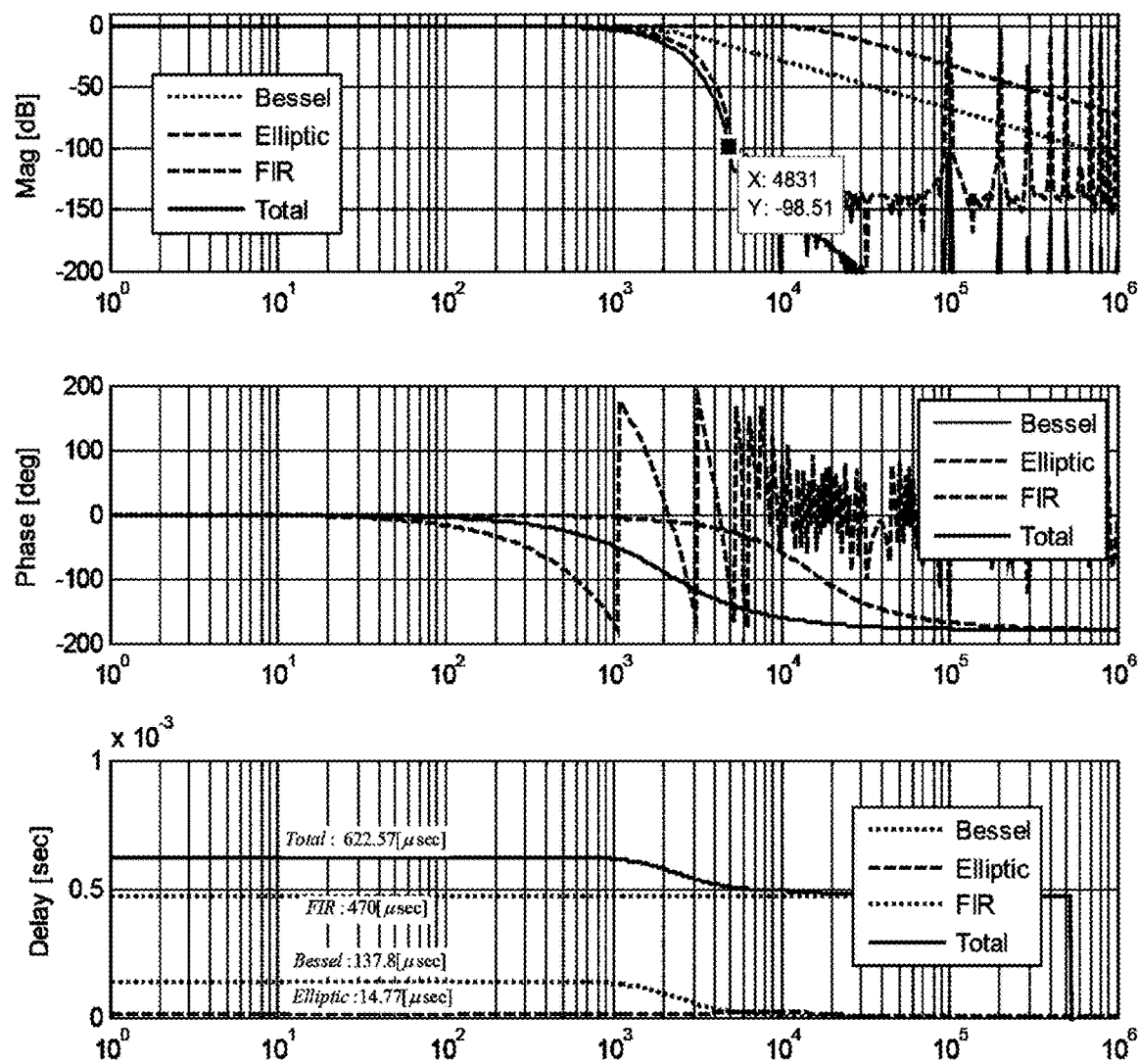
FIG. 10 is a graph illustrating a result of simulating frequency response characteristics of a device to which various types of filters are coupled according to the sixth embodiment.

In a sixth embodiment, the processor 200 may obtain a gain and a time delay at the half cutoff frequency that are determined by Equations 20 to 25 as shown in Table 4. Table-4 shows that at the half cutoff frequency, a gain was −1.44 and decreased by about 15%, and a time delay was 605.38 and decreased by about 2.8%, compared to a gain and a time delay at a frequency of 0. According to the sixth embodiment, it can be seen that frequency response characteristics of the device 1000 with a combination of various types of filters were as shown in FIG. 10 and a gain was −100 at frequencies of 5 or more and thus most of electrical noise was removed, and an effect caused by PWM was almost perfectly removed when a PWM frequency was set to 5 or more.

TABLE 4

| Type | Magnitude (dB) | | Group delay (uSec) | |
| --- | --- | --- | --- | --- |
| | f = 0 | f = 1000 | f = 0 | f = 1000 |
| Bessel | 0 | −1.1807 | 137.8 | 120.61 |
| Elliptic | 0 | −0.2637 | 15.005 | 14.77 |
| FIR | 0 | 0 | 470 | 470 |
| Total | 0 | −1.4444 | 622.81 | 605.38 |

In an embodiment, the processor 200 may calculate a delay phase angle by Equation 15 in the case of the low-pass filter 110 and the anti-aliasing filter 120 and calculate a time delay of an analog filter in the case of the FIR filter 130 in a process of compensating for a time delay. In this case, it can be efficient in terms of resource consumption of a micro-controller unit (MCI) that performs an operation by shortening an operation time required by the FIR filter 130. In an embodiment, the processor 200 may compensate for a time delay on the basis of whether the size of a gain function is 1 or less. For example, the processor 200 may compensate for a damping ratio of the gain function as shown in FIG. 4 when the size of the gain function is 1 or less, and compensate for the damping ratio of the gain function by subtracting a value greater than 1 from a calculated value of the gain function when the size of the gain function is less than 1, and in this case, a gain function compensator Mk may be determined on the basis of Equation 26.

$$M_k = \begin{cases} M_k + (1 - M_k), & M_k \le 1 \\ M_k - (M_k - 1), & M_k > 1 \end{cases}$$ [Equation 26]

In an embodiment, when an error of a time delay phase is within a preset allowable error range, the processor 200 may determine a phase for time delay compensation on the basis of a lookup table including information about a time delay. For example, as shown in Table 4, when an error between a time delay phase and a half cutoff frequency is about 2.8% and thus is within an allowable error range (e.g., 3%), a time delay $T_g$ calculated according the sixth embodiment may be expressed in the form of a constant on the basis of Equation 27 and used in the form of lookup table, and a delay phase angle may be determined on the basis of Equation 28 and a gain error may be naturally compensated for according to error dynamics of the device 1000 when the electric motor/generator 10 operates at a rated frequency. In this case, an operation of an algorithm may be easily performed even when a low-cost MCU in which a floating point unit (FPU) is not included is used for an operation of the processor 200.

$$T_g = T_{d1 @ f=rated} + T_{d2 @ f=rated} + T_{FIR}$$ [Equation 27]

$$\theta_d = T_d \times \omega$$ [Equation 28]

In an embodiment, the processor 200 may determine a three-phase current signal to pass through components of the device 1000 as shown in Equation 29 on the basis of Equation 28, and perform direct-quadrature (DQ) transformation to convert the three-phase current signal into a two-phase rotating coordinate system (Clarke transformation) as shown in Equation 30 on the basis of Equation 30 or determine a two-phase stationary coordinate system (park transformation) as shown in Equation 31 on the basis of Equation 30.

[Equation 29]
$$i_{fa} = \sin(\theta - \theta_d)$$
$$i_{fb} = \sin\left(\theta - \theta_d - \frac{2\pi}{3}\right)$$
$$i_{fc} = \sin\left(\theta - \theta_d + \frac{2\pi}{3}\right)$$

[Equation 30]
$$i_\alpha = \sin(\theta - \theta_d)$$
$$i_\beta = -\cos(\theta - \theta_d)$$

[Equation 31]
$$\begin{bmatrix} i_d \\ i_q \end{bmatrix} = \begin{bmatrix} \cos(\theta + \theta_d) & \sin(\theta + \theta_d) \\ -\sin(\theta + \theta_d) & \cos(\theta + \theta_d) \end{bmatrix} \begin{bmatrix} i_\alpha \\ i_\beta \end{bmatrix}$$

In an embodiment, the processor 200 may perform a series of operations to determine a current of the electric motor/generator 10, include a central processor unit (CPU) for control of overall operation of the device 1000, and may be electrically connected to the filter 100 and other components to control the flow of data between them.

In an embodiment, the device 1000 may further include the driver 300 that controls the driving of the electric motor/generator 10 by the processor 200 on the basis of a control signal, and the electric motor/generator 10 that rotates a rotor on the basis of power supplied from the driver 300.

In addition, it will be understood by those of ordinary skill in the art that the device 1000 may further include other general-purpose components, as well as the components shown in FIG. 1. For example, the device 1000 may further include a current detector that detects a current supplied to the electric motor/generator 10, a rotor position detector that detects the position of a rotor rotating in the electric motor/generator 10, and the like, and in another embodiment, some of the components shown in FIG. 1 or 2 may be omitted.

Figure 11:
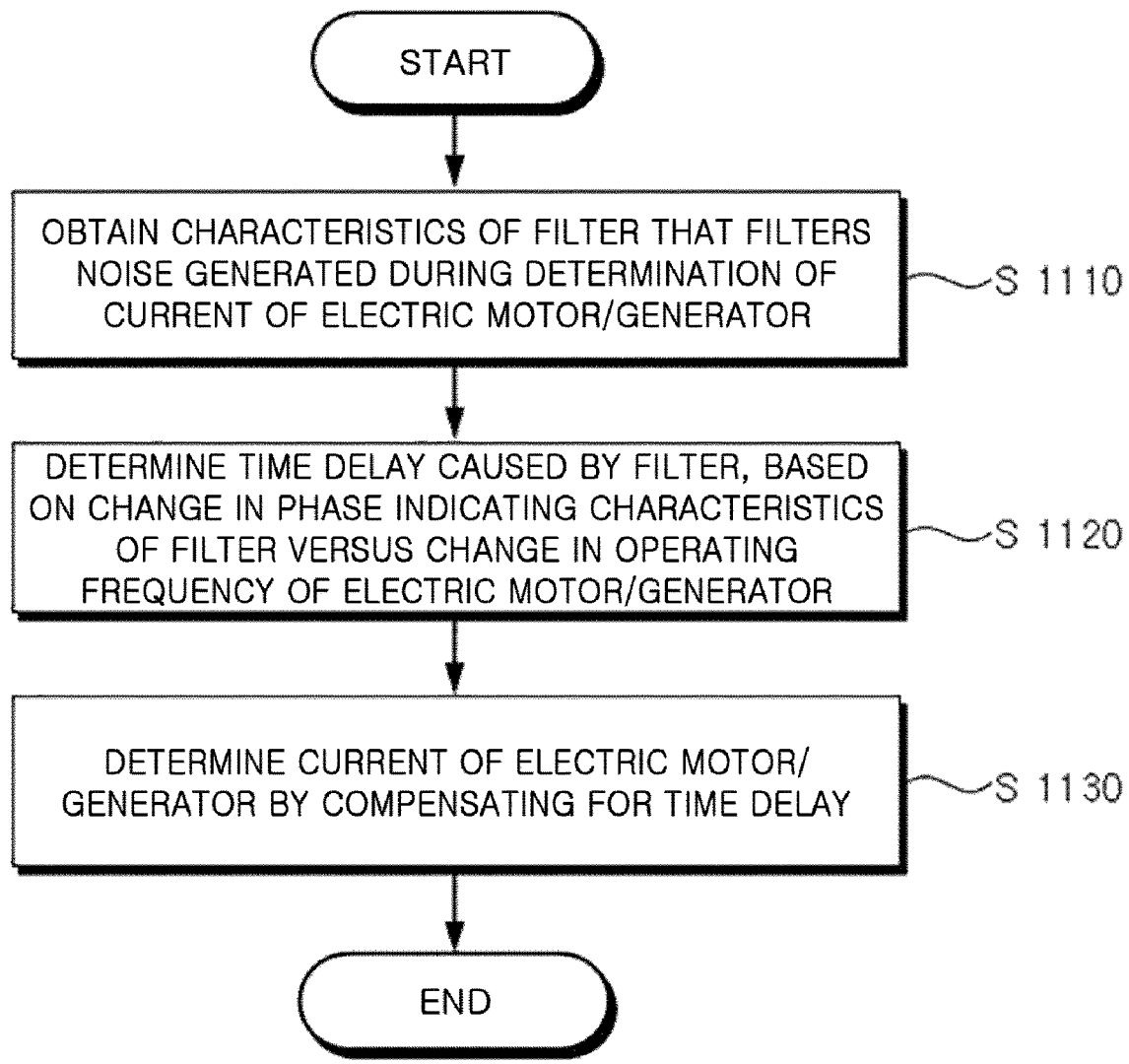
FIG. 11 is a flowchart of a method of determining a current of an electric motor or a generator by a device according to an embodiment.

FIG. 11 is a flowchart of a method of determining a current of the electric motor/generator 10 by the device 1000 according to an embodiment.

Referring to FIG. 11, in operation S1110, the device 1000 may obtain characteristics of the filter 100 that filters noise generated during the determination of a current of the electric motor/generator 10. In an embodiment, a magnitude and a phase of the filter 100 indicating characteristics of the filter 100 may be determined according to an operating frequency.

In operation S1120, the device 1000 may determine a time delay caused by the filter 100 on the basis of a change in a phase indicating the characteristics of the filter 100 versus a change in an operating frequency of the electric motor/generator 10. In an embodiment, the device 1000 may determine a time delay by differentiating a phase of a transfer function indicating the characteristics of the filter 100 with respect to the operating frequency.

In operation S1130, the device 1000 may determine the current of the electric motor/generator 10 by compensating for the time delay. In an embodiment, the device 1000 may update a phase of the current of the electric motor/generator 10 on the basis of a value obtained by multiplying the time delay by the operating frequency.

According to an embodiment of the present disclosure, the device 1000 may effectively compensate for the current of the electric motor/generator 10 by accurately determining the time delay caused by the filter 100 on the basis of a change in a phase indicating the characteristics of the filter 100.

FIGS. 12 to 15 are graphs showing results of a simulation improved by effectively compensating for a time delay by the device 1000 according to an embodiment.

Figure 12:
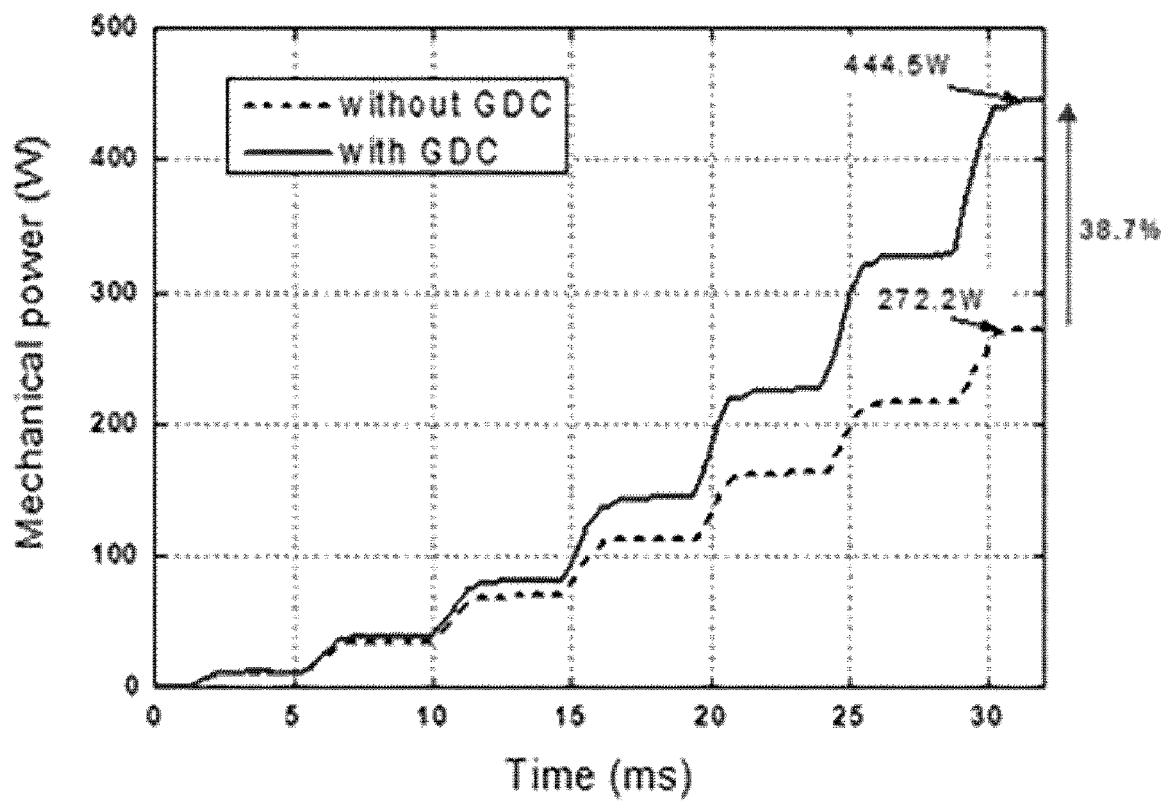
FIGS. 12 to 15 are graphs showing results of a simulation improved by effectively compensating for a time delay by a device according to an embodiment.
Figure 13:
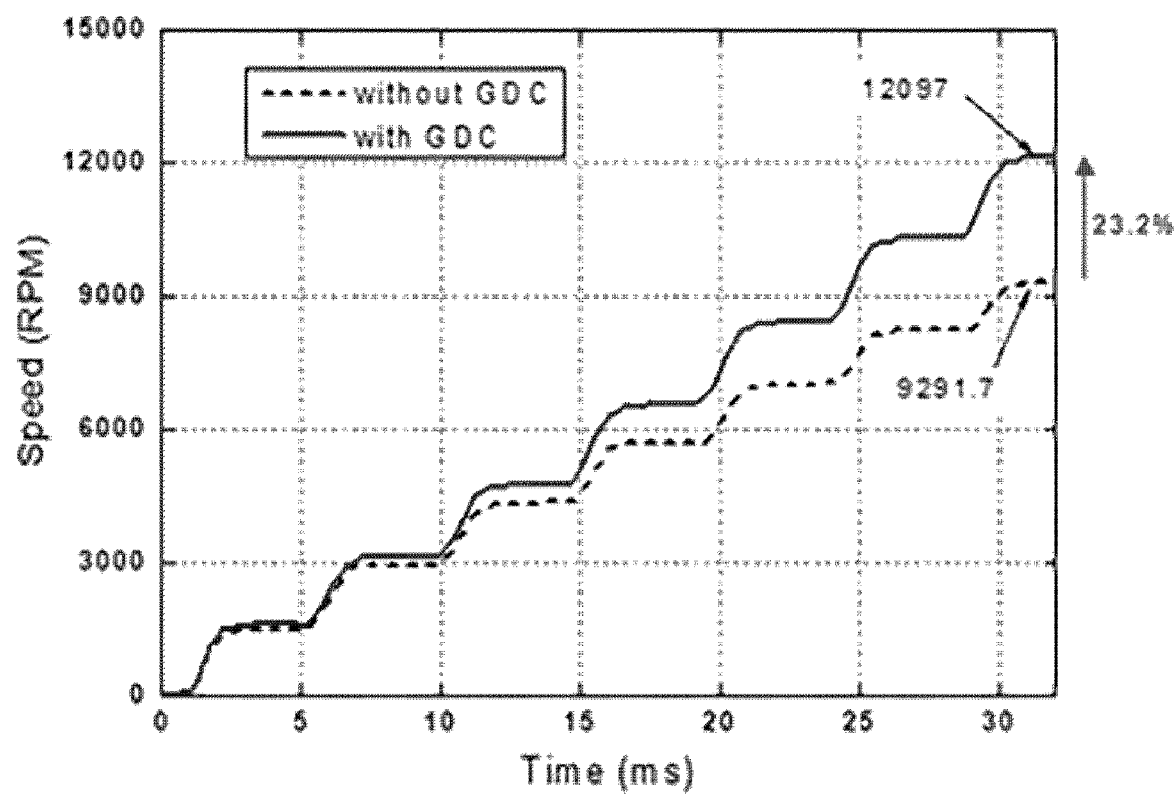
Figure 14:
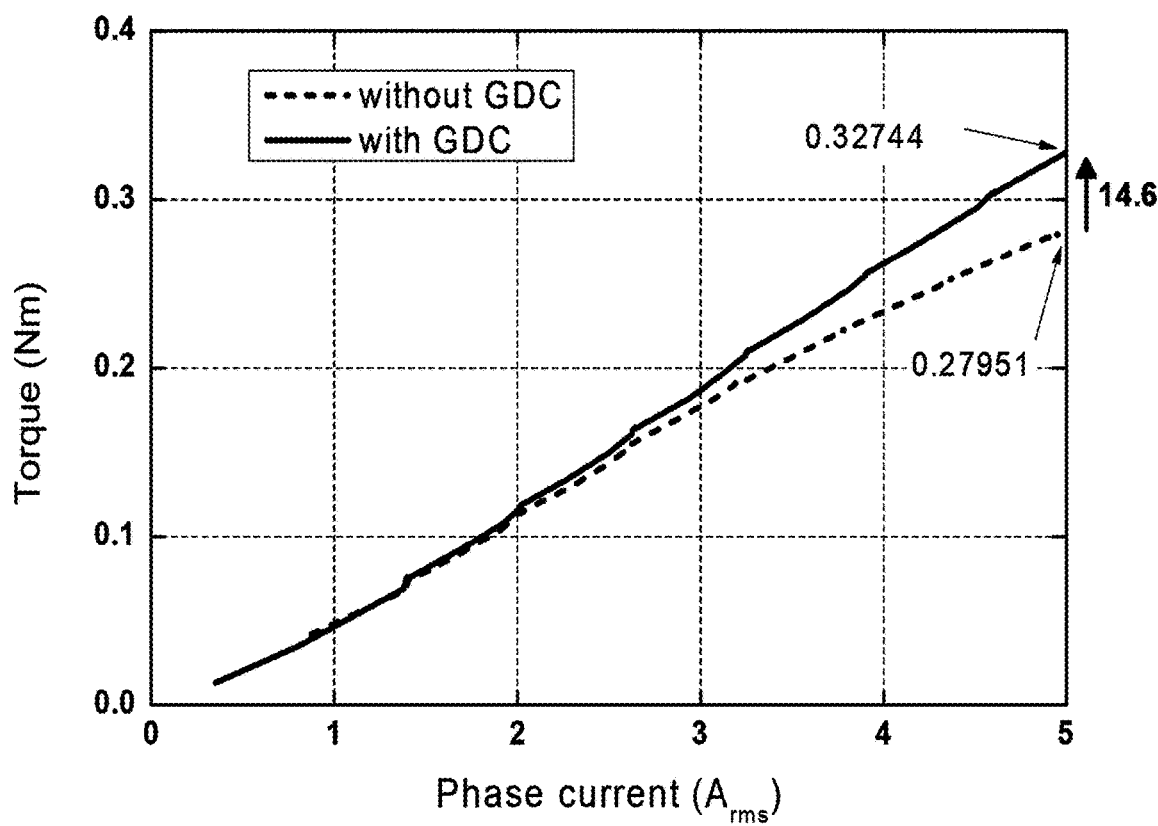
Figure 15:
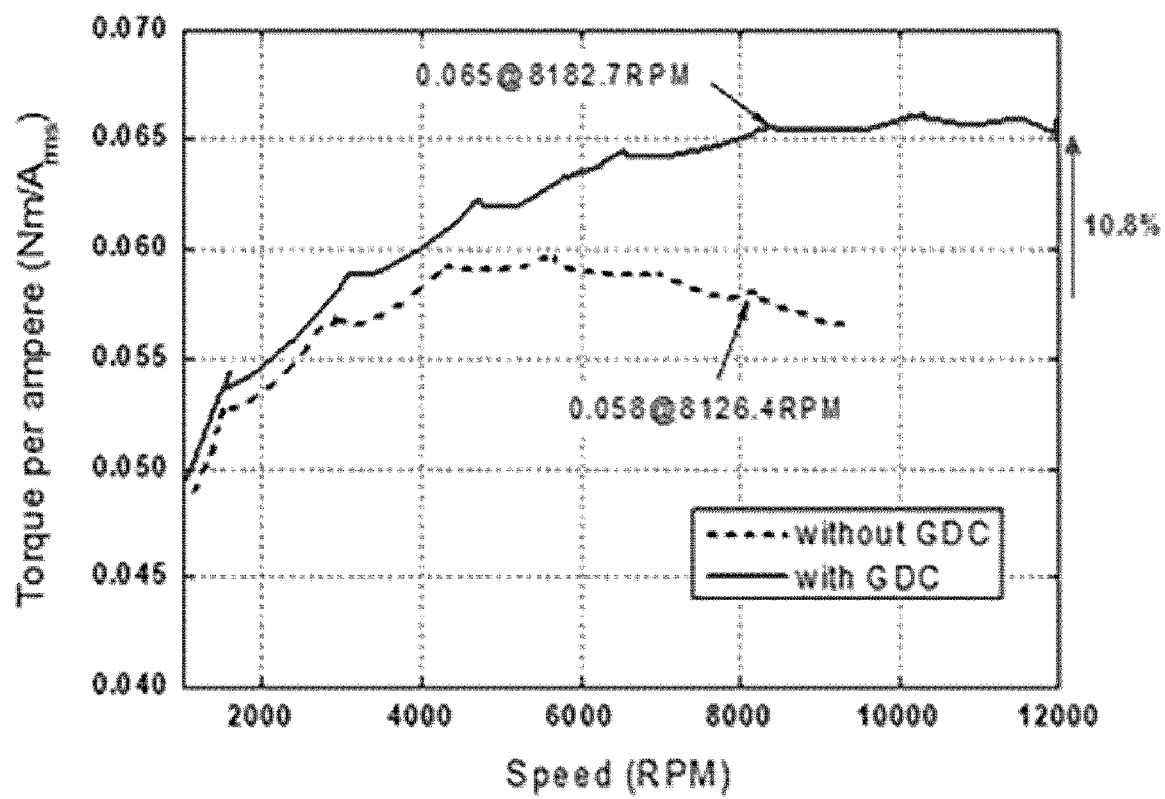

As a time delay caused by the filter 100 was effectively compensated for by the device 1000, referring to FIG. 12, a mechanical output was improved by about 38.7%, referring to FIG. 13, the speed of rotation was improved by about 28.2%, referring to FIG. 14, a torque generated from the same amount of current was increased by 14.6%, and referring to FIG. 15, a torque was improved by about 10.8% or more as the speed of rotation increased. In addition, as the time delay was compensated for by the device 1000, the consumption of current, the consumption of power, and the like were improved, and an effect of maintaining a constant torque up to a set revolution per minute (RPM) (e.g., 12000 RPM) can be achieved.

The above-described method may be embodied as a computer executable program and implemented in a general-purpose digital computer for execution of the program using a computer-readable recording medium. The data structures used in the above-described method may be recorded on a computer-readable recording medium through various means. Examples of the computer-readable recording medium include a storage medium such as a magnetic storage medium (e.g., a read-only memory (ROM), a random-access memory (RAM), a Universal Serial Bus (USB), a floppy disk, a hard disk, etc.) and an optical reading medium (e.g., a compact disc (CD)-ROM, a digital versatile disc (DVD), etc.).

The above description of the present disclosure is intended to provide examples, and it will be understood by those of ordinary skill in the art that modifications may be made without departing from the technical idea or essential features of the present disclosure. Therefore, it should be understood that the embodiments described above are merely examples in all respects and not restrictive. For example, components each described as a single type may be implemented in a distributed manner, and components described as being distributed may be implemented in a combined form.

The scope of the present disclosure should be defined by the following claims, and all changes or modifications derivable from the claims and their equivalents should be construed as being included in the scope of the present disclosure.

The invention claimed is:

1. A method of determining a current of an electric motor or generator, comprising:
   obtaining characteristics of a filter for eliminating noise generated during determination of a current of the electric motor or the generator;
   determining a time delay caused by the filter on the basis of a change in a phase indicating the characteristics of the filter versus a change in an operating frequency of the electric motor or generator, wherein a magnitude and a phase indicating the characteristics of the filter are determined by the operating frequency; and determining a current of the electric motor or the generator based on the time delay.

2. The method of claim 1, wherein the filter comprises at least one of a low-pass filter, an anti-aliasing filter, or a finite impulse response (FIR) filter.

3. The method of claim 1, wherein the filter comprises a low-pass filter, an anti-aliasing filter, and a finite impulse response (FIR) filter, and the time delay is determined by adding a first time delay caused by the low-pass filter, a second time delay caused by the anti-aliasing filter, and a third time delay caused by the FIR filter.

4. The method of claim 1, wherein the determining of the current of the electric motor or the generator comprises updating a phase of the current of the electric motor or the generator on the basis of a value obtained by multiplying the time delay by the operating frequency.

5. The method of claim 1, wherein the determining of the time delay comprises determining the time delay by differentiating a phase of a transfer function indicating the characteristics of the filter with respect to the operating frequency, wherein for the phase of the transfer function, the operating frequency is used as an input variable.

6. The method of claim 5, wherein, when the transfer function ($G_2(s)$) satisfies the following Equation (1), the time delay ($\rho_2$) satisfies the following Equation (2):

$$G_2(s) = \frac{\omega_n^2}{s^2 + 2\zeta\omega_n s + \omega_n^2}; \text{ and} \quad (1)$$

$$\rho_2 = -\frac{2\zeta\omega_n(\omega^2 + \omega_n^2)}{\omega^4 + 2\omega_n^2(2\zeta - 1)\omega^2 + \omega_n^4}. \quad (2)$$

7. A computer-readable recording medium having recorded thereon a program for performing the method of claim 1 in a computer.

8. A device for determining a current of an electric motor or generator, comprising:

a filter configured to eliminate noise generated during determination of a current of the electric motor or the generator; and a processor configured to obtain characteristics of the filter, determine a time delay caused by the filter on the basis of a change in a phase indicating the characteristics of the filter versus a change in an operating frequency of the electric motor or generator, wherein a magnitude and a phase indicating the characteristics of the filter are determined by the operating frequency, and determine a current of the electric motor or the generator based on the time delay.

9. The device of claim 8, wherein the filter comprises at least one of a low-pass filter, an anti-aliasing filter, or a finite impulse response (FIR) filter.

10. The device of claim 8, wherein the filter comprises a low-pass filter, an anti-aliasing filter, and a finite impulse response (FIR) filter, and the time delay is determined by adding a first time delay caused by the low-pass filter, a second time delay caused by the anti-aliasing filter, and a third time delay caused by the FIR filter.

11. The device of claim 8, wherein the processor updates a phase of the current of the electric motor or the generator on the basis of a value obtained by multiplying the time delay by the operating frequency.

12. The device of claim 8, wherein the processor determines the time delay by differentiating a phase of a transfer function indicating the characteristics of the filter with respect to the operating frequency, wherein for the phase of the transfer function, the operating frequency is used as an input variable.

13. The device of claim 12, wherein, when the transfer function ($G_2(s)$) satisfies the following Equation (1), the time delay ($\rho_2$) satisfies the following Equation (2):

$$G_2(s) = \frac{\omega_n^2}{s^2 + 2\zeta\omega_n s + \omega_n^2}; \text{ and} \quad (1)$$

$$\rho_2 = -\frac{2\zeta\omega_n(\omega^2 + \omega_n^2)}{\omega^4 + 2\omega_n^2(2\zeta - 1)\omega^2 + \omega_n^4}. \quad (2)$$

\* \* \* \* \*